United States Patent
Dubbels et al.

(10) Patent No.: US 10,055,410 B1
(45) Date of Patent: *Aug. 21, 2018

(54) CORPUS-SCOPED ANNOTATION AND ANALYSIS

(71) Applicant: INTERNATIONAL BUSINESS MACHINES CORPORATION, Armonk, NY (US)

(72) Inventors: Joel C. Dubbels, Rochester, MN (US); Mark G. Megerian, Rochester, MN (US); William C. Rapp, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/704,095

(22) Filed: Sep. 14, 2017

Related U.S. Application Data

(63) Continuation of application No. 15/585,223, filed on May 3, 2017.

(51) Int. Cl.
*G06F 17/30* (2006.01)
*G06F 17/24* (2006.01)

(52) U.S. Cl.
CPC ...... *G06F 17/30011* (2013.01); *G06F 17/241* (2013.01); *G06F 17/30442* (2013.01); *G06F 17/30958* (2013.01)

(58) Field of Classification Search
CPC ............. G06F 17/241; G06F 17/30011; G06F 17/30442; G06F 17/30958
See application file for complete search history.

(56) References Cited

U.S. PATENT DOCUMENTS

| | | |
|---|---|---|
| 6,519,603 B1 | 2/2003 | Bays et al. |
| 7,548,933 B2 | 6/2009 | Krishnamurthy et al. |
| 8,756,229 B2 | 6/2014 | Stockton et al. |
| 9,298,816 B2 | 3/2016 | Dimassimo et al. |
| 9,348,815 B1* | 5/2016 | Estes ................... G06F 17/2785 |
| 9,384,450 B1* | 7/2016 | Cordes ..................... G06N 5/04 |
| 9,406,020 B2 | 8/2016 | Arroyo et al. |
| 9,514,414 B1* | 12/2016 | Rosswog ................. G06N 5/04 |
| 2005/0080613 A1* | 4/2005 | Colledge ............. G06F 17/2785 704/9 |
| 2006/0294077 A1 | 12/2006 | Bluhm et al. |
| 2009/0112841 A1 | 4/2009 | Devarakonda et al. |

(Continued)

OTHER PUBLICATIONS

Mell et al., "The NIST Definitio of Cloud Computing", NIST, Sep. 2011, pp. 1-7, Special Publication 800-145, U.S. Department of Commerce, Gaithersburg, MD.

(Continued)

*Primary Examiner* — Kris E Mackes
*Assistant Examiner* — Tiffany Thuy T Bui
(74) *Attorney, Agent, or Firm* — Anthony M. Pallone

(57) ABSTRACT

Corpus-scoped annotation and analysis. Enrichment analysis data is generated including annotations and metadata for a plurality of documents that are part of a corpus. Whether to generate a second set of annotations is determined, based on a correlation of the annotations and metadata. A relational database is populated with the enrichment analysis data. A corpus-scoped query is resolved, initiated by an application, using the enrichment analysis data and content of the corpus.

1 Claim, 6 Drawing Sheets

(56) References Cited

U.S. PATENT DOCUMENTS

| | | | |
|---|---|---|---|
| 2010/0198837 A1* | 8/2010 | Wu | G06F 17/30672 |
| | | | 707/748 |
| 2011/0125764 A1* | 5/2011 | Carmel | G06F 17/30637 |
| | | | 707/749 |
| 2011/0225155 A1* | 9/2011 | Roulland | G06F 17/30598 |
| | | | 707/737 |
| 2012/0254143 A1* | 10/2012 | Varma | G06F 17/2785 |
| | | | 707/706 |
| 2015/0019589 A1 | 1/2015 | Arroyo et al. | |
| 2015/0095303 A1* | 4/2015 | Sonmez | G06N 5/003 |
| | | | 707/707 |
| 2016/0078014 A1 | 3/2016 | Avasarala et al. | |
| 2016/0092474 A1* | 3/2016 | Stojanovic | G06F 3/04842 |
| | | | 707/805 |
| 2016/0132590 A1 | 5/2016 | Byron et al. | |
| 2016/0179933 A1 | 6/2016 | Dimassimo et al. | |
| 2017/0329757 A1* | 11/2017 | Knudson | G06F 17/2235 |
| 2017/0344649 A1* | 11/2017 | Vinnakota | G06F 17/30958 |

OTHER PUBLICATIONS

IBM, "List of IBM Patents or Patent Applications Treated as Related (Appendix P)," Feb. 2, 2018, p. 1-2.

Pending U.S. Appl. No. 15/585,223, filed May 3, 2017, entitled "Corpus-Scoped Annotation and Analysis ", 35 Pages.

\* cited by examiner

CORPUS-SCOPED ANNOTATION AND ANALYSIS

FIELD OF THE INVENTION

The present invention relates generally to the field of content analysis, and more particularly analyzing content in a cognitive computational environment.

SUMMARY

Embodiments of the present invention provide systems, methods, and computer program products for corpus-scoped annotation and analysis. Enrichment analysis data is generated including annotations and metadata for a plurality of documents that are part of a corpus. Whether to generate a second set of annotations is determined, based on a correlation of the annotations and metadata. A relational database is populated with the enrichment analysis data. A corpus-scoped query is resolved, initiated by an application, using the enrichment analysis data and content of the corpus.

DETAILED DESCRIPTION

Figure 1:
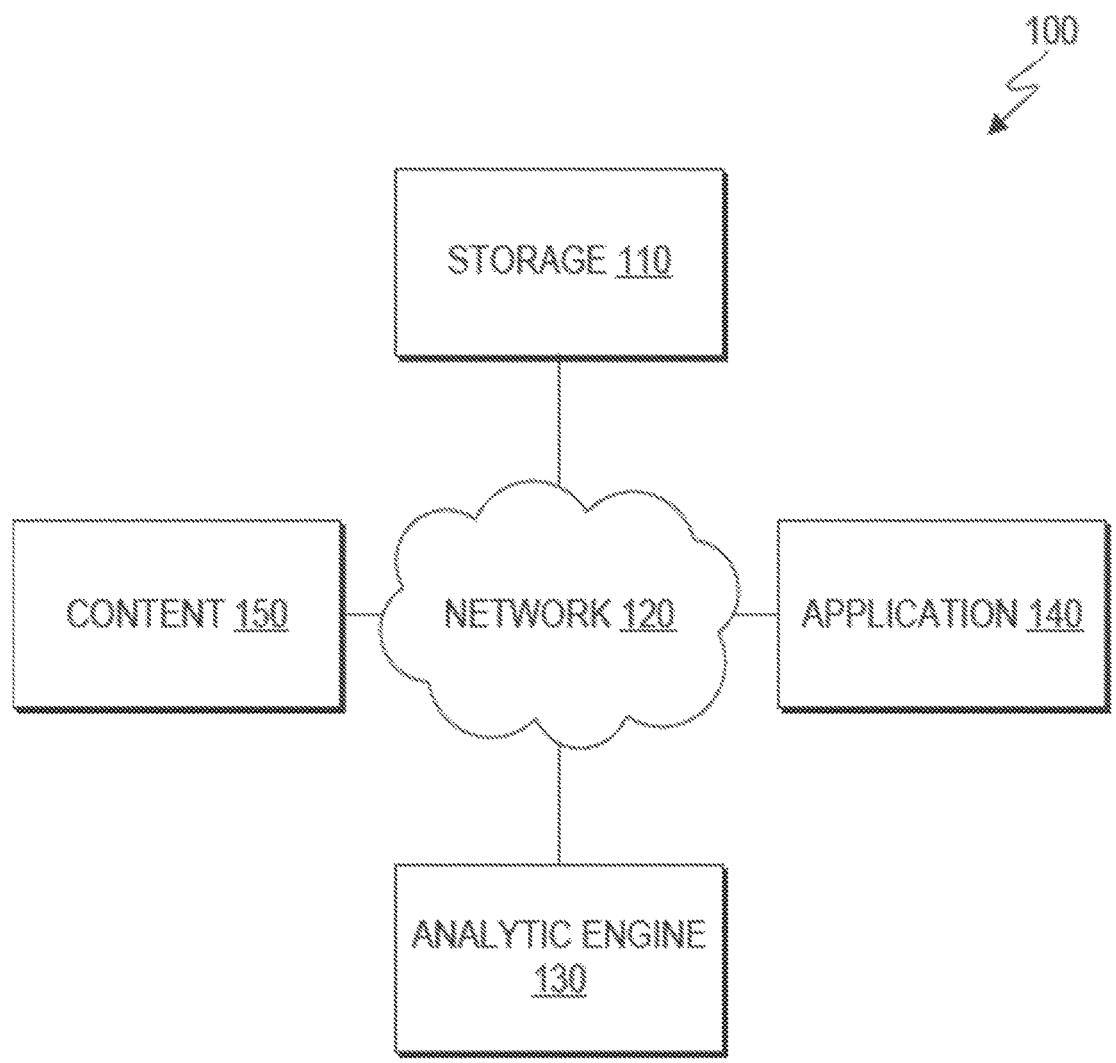
FIG. 1 is a block diagram of a cognitive computing environment, in accordance with an embodiment of the present invention.

A cognitive computing environment may implement services to generate a searchable corpus from structured, semi-structured, and/or unstructured data. The corpus may be cognitively processed by analytic engines to provide knowledge and insights relative to a domain, a topic, a person, or an issue, based on training and observations from all varieties, volumes, and velocities of data. The analytic engines may create models to represent the domain and generate and score hypotheses to answer questions and/or provide further insight. For example, such analytic engines may rely on rule-based learning as well as machine-learning to generate analysis data for the corpus, whereby the analysis data may be used by applications wishing to perform higher level cognitive processing (e.g., knowledge and insights).

Typical cognitive computing environments handle annotations and other analysis data for a corpus at a document granularity, thereby making it difficult to search and analyze annotations at an entire document-set level, or in a corpus-scoped manner. Typically, methods for cognitive processing rely on techniques such as storing the annotated context in a uniform annotation structure (e.g., Unstructured Information Management Architecture (UIMA™) Common Analysis System (CAS) Object, JavaScript Object Notation (JSON) Object, etc.). All terms mentioned in this specification that are known to be trademarks or service marks have been appropriately capitalized. Use of such terms in this specification should not be regarded as affecting the validity of the trademark or service mark. UIMA™ is a trademark of the Apache Software Foundation under Apache License 2.0. These techniques may provide a complete representation of the annotations that exist in documents, and later index the documents by keywords to enable a lookup using keywords. If the documents are identified via a keyword search, then the full annotation structure may be used to retrieve the annotations for the identified documents.

Although typical cognitive computing environments enable applications to handle higher level cognitive processing of a corpus and a document-set level, the typical cognitive computing environments do not easily provide applications with the ability to determine relationships and trends across the entire corpus. For example, a typical cognitive computing environment receive a query, "which concepts frequently occur together or are in close proximity?" In this example, the typical cognitive computing environment may attempt to handle the query by inefficiently analyzing each set of annotated documents within the corpus to identify detailed annotations, and typically, the index of keywords or annotations generated by the analytic engines do not include the level of detail required for this type of query. Accordingly, it may be advantageous to create a relational, indexed storage solution for storing content, metadata and annotations for a corpus in a normalized manner such that annotation search and analysis can be performed in a comprehensive and corpus-scoped manner. Furthermore, an instance of such a storage solution may result in billions of annotations across millions of documents included in a corpus.

Embodiments of the present invention provide methods, systems, and computer program products for generating enrichment analysis data including annotations and metadata for a plurality of documents that are part of a corpus. Embodiments of the present invention populate a relational database with the enrichment analysis data, wherein the relational database is configured to manage content, participate in incremental ingestion and provide versioning capabilities. Furthermore, embodiments of the present invention resolve a corpus-scoped query initiated by an application using the enrichment analysis data and content of the corpus.

FIG. 1 is a block diagram of cognitive computing environment 100, in accordance with an embodiment of the present invention. Cognitive computing environment 100 includes storage 110, analytic engine 130, application 140, and content 150, interconnected by network 120. In this embodiment, components of cognitive computing environment 100 (e.g., storage 110, analytic engine 130, etc.) are each a part of separate computing systems connected by network 120. In another embodiment, a portion of such components may be included in one or more computing systems, such that any separate components are configured to exchange data between one another over network 120. Furthermore, such computing systems may be desktop computers, laptop computers, specialized computer servers, or any other computer system known in the art. In certain embodiments, the computing systems may represent computer systems utilizing clustered computers and components to act as a single pool of seamless resources when accessed through network 120. For example, such embodiments may be used in data center, cloud computing, storage area network (SAN), wide area network (WAN), and network attached storage (NAS) applications. In certain embodiments, the computing systems represent virtual machines. In general, the computer systems described herein are representative of any electronic device, or combination of electronic devices, capable of executing machine-readable program instructions, in accordance with an embodiment of the present invention, as described in greater detail with regard to FIG. 4. In this embodiment, the computing systems are implemented in various cloud computing environments, as described in greater detail with regard to FIGS. 5 and 6.

Network 120 can be, for example, a local area network (LAN), a wide area network (WAN) such as the Internet, or a combination of the two, and include wired, wireless, or fiber optic connections. In general, network 120 can be any combination of connections and protocols that will support communications between storage 110, analytic engine 130, application 140, and content 150, in accordance with an embodiment of the invention.

Figure 2:
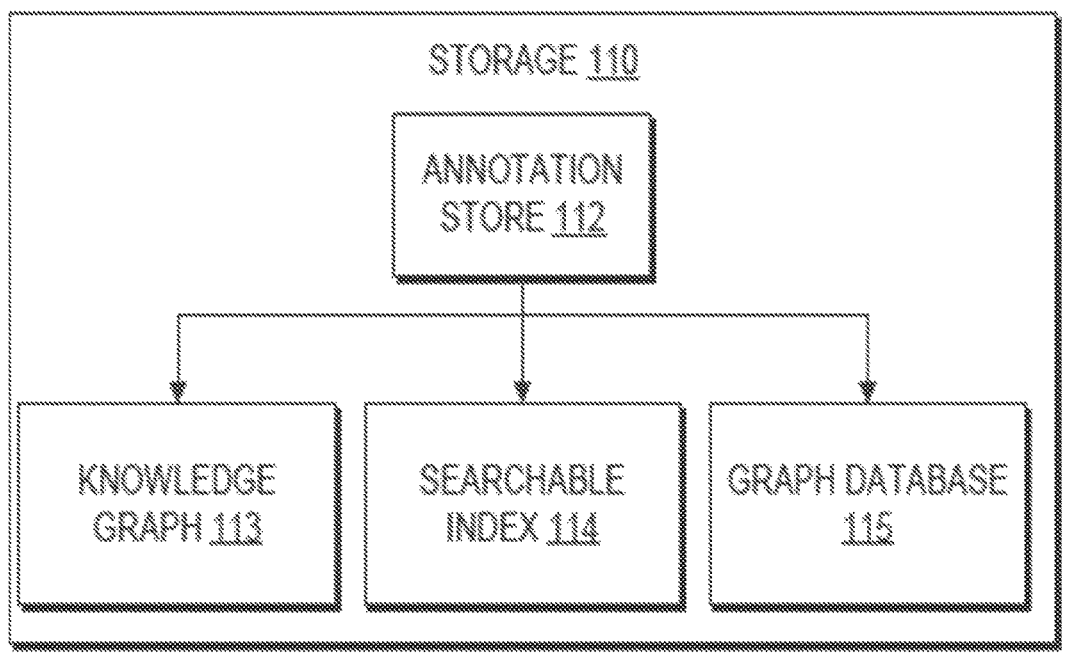
FIG. 2 is a block diagram of generated runtime artifacts using an annotation store, in accordance with an embodiment of the present invention.

Storage 110 represents a storage component configured to store a corpus generated from content 150 in addition to enrichment analysis data (e.g., annotations and metadata) produced by analytic engine 130, as described in greater detail with regard to FIG. 2. In this embodiment, storage 110 includes a relational database, such as IBM® DB2®, or another type of relational database management system (RDBMS), storing the normalized collection of the enrichment analysis data. IBM® DB2® are registered trademarks of International Business Machines Corporation. Storage 110 leverages the benefit of a relational database by providing features and functions such as, query optimization, filtering, summarization, joins, groupings, derived values, incremental ingestions, updates/deletes, security, reliability, performance, scalability, disaster recovery, and auditability. These features and functions enable cognitive computing environment 100 to manage content 150 at the content provider, document, annotator, and annotation level, and further provides the ability to participate in batch and incremental ingestion, as well as provide versioning capabilities. Furthermore, enrichment analysis data stored in storage 110 may be used to populate an annotation store from which knowledge graphs, searchable indices, and graph databases can be generated, as described in FIG. 2.

Analytic engine 130 is a software component configured to process and ingest content 150 into a searchable corpus as well as generate enrichment analysis data for the corpus, including annotations and metadata. For example, analytic engine 130 may validate structured, semi-structured, and unstructured data included in content 150 to ensure that it is readable, searchable, and comprehensible. Furthermore, analytic engine 130 provides configurable, extensible ingestion workflows to support natural language processing, text analysis, text mining and content enrichment capabilities. Features such as language identification, semantic scoring, lemmatization, clustering and classification, key phrase extraction, synonym expansion, document and entity sentiment calculation, dictionary-based and/or statistical-based entity extraction, predictive analytics, and trending entity identification may be supported by analytic engine 130. In this embodiment, analytic engine 130 relies on rule-based and machine learning to analyze, process and ingest content 150. For example, document and entity-sentiment calculation may be performed by analytic engine 130 using machine learning, and predictive analytics may be performed by analytic engine 130 using classification regression and pairwise correlations (i.e., rule-based).

In this embodiment, analytic engine 130 leverages the above-mentioned features and capabilities to generate annotations and metadata for an entire corpus and then populate an annotation store with the generated annotations and metadata. For example, analytic engine 130 may prepare (e.g., evaluate, validate, curate, transform and/or enhance) the data included in content 150. Afterwards, analytic engine 130 may produce a collection of vetted data (e.g., ground truth or gold standard data) by involving subject matter experts to create resources (e.g., annotation guidelines, types of systems, dictionaries of terms). Additionally, the collection of vetted data can be produced by pre-annotating the data based on dictionaries provided to analytic engine 130, where pre-annotating is a process of machine-annotating the data of content 150 to the extent possible before a machine-learning model is available to do so. Pre-annotation can reduce human-annotation labor by replacing some human annotation creation with mere verification of the correctness of machine annotation. In this example, after establishing the collection of vetted data, analytic engine 130 may be used to train an algorithm for automatically adding annotations to large collections of documents, such as collections that include millions of documents. Accordingly, analytic engine 130 uses the trained algorithm as well as the above-mentioned features (e.g., language identification, semantic scoring, lemmatization, clustering and classification, key phrase extraction, synonym expansion, document and entity sentiment calculation, dictionary-based and/or statistical-based entity extraction, predictive analytics, and trending entity identification) to create annotations for data in content 150.

Content 150 represents structured, semi-structured, and unstructured data that is provided by one or more content providers and is used to create a searchable corpus for analytic engine 130 to later analyze. In one embodiment, data included in content 150 may be evaluated and then later curated, enhanced, and/or transformed by analytic engine 130 prior to ingesting the data into a searchable corpus. For example, content 150 may be evaluated to ensure that text-based resources such as journal articles, textbooks, and research documents are annotated with headings or tags to assist cognitive computing environment 100 identify and classify the content in specific documents.

Application 140 represents a software component configured to analyze a corpus and enrichment analysis data (e.g., annotations and metadata) to perform higher level cognitive processing, such as knowledge and insight analytics relative to a domain, a topic, a person, or an issue. Application 140 interacts with storage 110 to retrieve pertinent information that is necessary to answer complex queries and summarize annotations across many millions of documents included in the corpus. In one embodiment, application 140 may be used in conjunction with analytic engine 130 to generate and/or regenerate cognitive computing artifacts such as knowledge graphs, searchable indices, and graph databases, as described in FIG. 2.

The descriptions of the various embodiments of the present invention have been presented for the purposes of illustration, but are not intended to be exhaustive or limited to the embodiments disclosed. Many modifications and variations will be apparent to those of ordinary skill in the art without departing form the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

FIG. 2 is a block diagram of storage 110, in accordance with an embodiment of the present invention. In this embodiment, annotation store 112 is a relational database, such as IBM® DB2®, from which the runtime artifacts including knowledge graph 113, searchable index 114 and graph database 115 are generated. In another embodiment, other higher-level knowledge artifacts may be generated, such as analysis and scoring algorithms. Annotation store 112 provides the ability for incremental updates, deletes and versioning for enrichment analysis data because it is a relational database. In contrast, typical cognitive computing systems do not implement such relational databases, thereby requiring a full replacement when an annotator changes. The use of a relational database in storage 110 provides for more efficient filtering operations. For example, consider a corpus with many generated annotations that may not be needed for a particular use case. In this example, the relational database, or annotation store 112, allows for efficient creation of an instance that only includes annotations needed for the particular use case, and eliminates the remaining generated annotations.

Storage 110 relies on a combination of annotation store 112 as well as a stored corpus including the full textual content of each document, thus eliminating the need for UIMA™ CAS objects, JSON objects, and/or other structures for each document. Furthermore, such objects and/or structures may be discarded when the annotators are executed and annotation store 112 is populated, thus reducing the storage requirement and save time during deployment. Additionally, annotation store 112 is not only a representation of the annotators which have been executed, but it may also become an additional source of correlations and insights that can provide for new annotations, which may also be populated back into annotation store 112. Accordingly, such a recursive annotation process may be advantageous, because a first analysis is performed with individual annotators, and then another analysis may be performed against the entire corpus.

Knowledge graph 113 represents a knowledge base used to enhance searchability with semantic-search information gathered from a variety of sources. For example, application 140 may interact with knowledge graph 113 to resolve a query without navigating through individual documents of the corpus and subsequently assemble the pertinent information. Searchable index 114 represents a collection of data, such as a table or index that is used to achieve efficient and fast search responses because, instead of application 140 searching the text directly, application 140 searches an index instead. Graph database 115 represents a scalable database that uses graph structures for semantic queries with nodes, edges and proprieties to represent and store data. Furthermore, the graph, or edge or relationship, directly relates data items in the store, allowing data in the store to be linked together directly, and retrieved with one operation. Accordingly, the enrichment analysis data stored in storage 110, including the annotations and metadata which identify the meaning of text, and not just text patterns, in addition to the text content of a corpus provides the ability to perform annotation search and analysis in a comprehensive and corpus-scoped manner.

Figure 3:
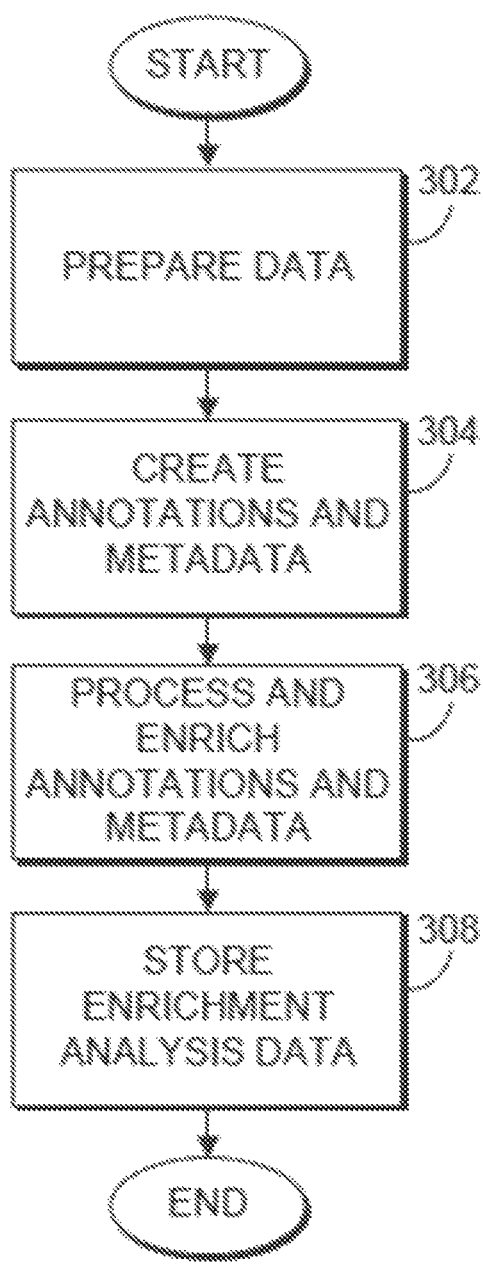
FIG. 3 is a flowchart illustrating operational steps for creating and storing enrichment analysis data, in accordance with an embodiment of the present invention.

FIG. 3 is a flowchart illustrating operational steps for creating and storing enrichment analysis data, in accordance with an embodiment of the present invention. In this embodiment, content 150 includes various types of data used to generate a corpus. Furthermore, analytic engine 130 provides tools and services to analyze, process and ingest content 150 resulting in the generation of enrichment analysis data that is stored in storage 110.

Analytic engine 130 prepares the data (step 302). In one embodiment, analytic engine 130 may evaluate, validate, curate, transform and/or enhance the data included in content 150 prior to ingestion. Furthermore, analytic engine 130 may rely on rule-based and/or machine learning techniques to ensure that all relevant terminology, such as entity names, domain vocabulary, and special expressions, are identifiable prior to ingestion.

After the data is prepared, analytic engine 130 creates annotations and metadata for the documents included in the generated corpus (step 304). Metadata may include details about the generated annotations or other word, phrase, concept, and/or document relationships. As previously described, analytic engine 130 uses trained algorithms, rule-based, and other machine-learning techniques to create annotations for data in the generated corpus. For example, a collection of vetted data (e.g., ground truth or gold standard data) may be created to train an algorithm used by analytic engine 130. In this example, the use of the trained algorithm in addition to other analytic engine 130 features (e.g., language identification, semantic scoring, lemmatization, clustering and classification, key phrase extraction, synonym expansion, document and entity sentiment calculation, dictionary-based and/or statistical-based entity extraction, predictive analytics, and trending entity identification) enable analytic engine 130 to create annotations and metadata for the documents included in the generated corpus. Furthermore, analytic engine 130 may support incremental annotation, as well as support incremental ingestion. In instances where corpus updates are received, analytic engine 130 may also analyze and process the data included in the corpus updates to create, generate or regenerate, annotators and metadata.

Analytic engine 130 subsequently processes and enriches the annotations and metadata to generate enrichment analysis data (step 306). For example, as previously described, annotation store 112 is not only a representation of the annotators which have been executed, but it may also become an additional source of correlations and insights that can provide for new annotations, which may also be populated back into annotation store 112. Accordingly, such a recursive annotation process performed during this enrichment phase may be advantageous, because a first analysis is performed with individual annotators, and then another analysis may be performed against the entire corpus. In another example, enriching the annotations and metadata may performed after receiving an updated collection of vetted data (e.g., ground truth or gold standard data) due to, for example, an updated corpus. In this example, if an updated collection of vetted data is used to re-train an algorithm of analytic engine 130, then analytic engine 130 applies the newly trained algorithm along with any updated analysis features to generate new annotations and metadata. Accordingly, the new annotations and metadata results are compared to the previously generated annotations and metadata, and any identified conflicts are resolved. Adjudication in this phase is needed to ensure accurate and consistently annotated documents included in the enrichment analysis data are promoted to ground truth data. In one embodiment, annotator updates may be received during enrichment, whereby an incremental annotation process may be initiated.

Once the enrichment analysis data is generated, then it is stored in storage 112 (step 308). As previously described, annotations and metadata that are part of the enrichment analysis data may be stored in a relational database, such as annotation store 112, thereby providing application 140 with the ability to search and analyze annotations at a corpus-scoped manner. Once enrichment analysis data is stored in a relational database, cognitive computing environment 100 is configured to receive a corpus-scoped query, optimize the corpus-scoped query using query optimizations features of a relational database management system, and resolve the corpus-scoped query using the enrichment analysis data that described annotations and metadata for the entire corpus. The use of relational databases enables for the generation of additional runtime artifacts, such as knowledge graphs, searchable indices, and graph databases, which may be used by analytic engine 130 to resolve the corpus-scoped query.

Figure 4:
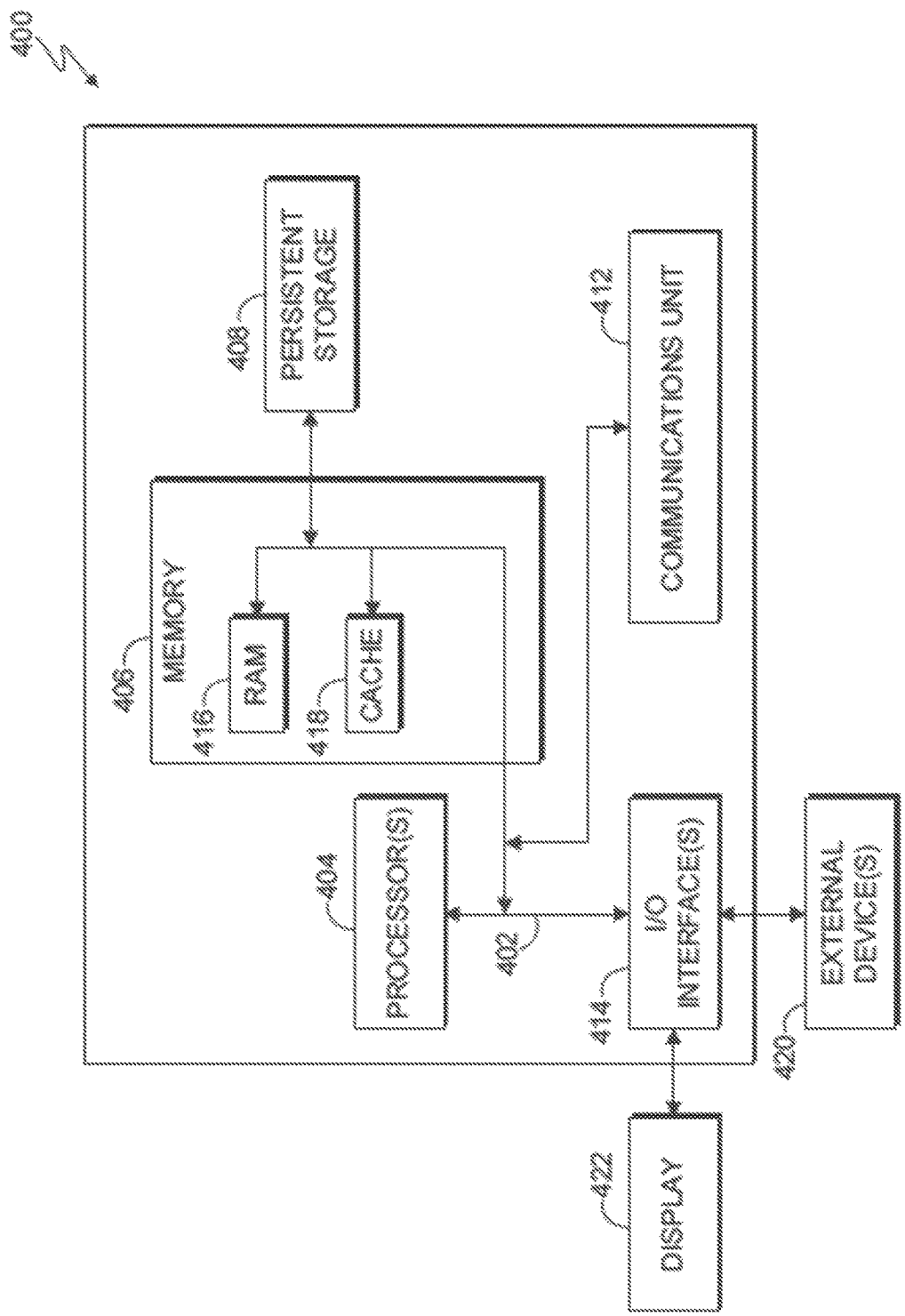
FIG. 4 is a block diagram of internal and external components of the computer systems of FIG. 1, in accordance with an embodiment of the present invention.

FIG. 4 is a block diagram of internal and external components of a computer system 400, which is representative the computer systems of FIG. 1, in accordance with an embodiment of the present invention. It should be appreciated that FIG. 4 provides only an illustration of one implementation and does not imply any limitations with regard to the environments in which different embodiments may be implemented. In general, the components illustrated in FIG. 4 are representative of any electronic device capable of executing machine-readable program instructions. Examples of computer systems, environments, and/or configurations that may be represented by the components illustrated in FIG. 4 include, but are not limited to, personal computer systems, server computer systems, thin clients, thick clients, laptop computer systems, tablet computer systems, cellular telephones (e.g., smart phones), multiprocessor systems, microprocessor-based systems, network PCs, minicomputer systems, mainframe computer systems, and distributed cognitive computing environments that include any of the above systems or devices.

Computer system 400 includes communications fabric 402, which provides for communications between one or more processors 404, memory 406, persistent storage 408, communications unit 412, and one or more input/output (I/O) interfaces 414. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer-readable storage media. In this embodiment, memory 406 includes random access memory (RAM) 416 and cache memory 418. In general, memory 406 can include any suitable volatile or non-volatile computer-readable storage media. Software is stored in persistent storage 408 for execution and/or access by one or more of the respective processors 404 via one or more memories of memory 406.

Persistent storage 408 may include, for example, a plurality of magnetic hard disk drives. Alternatively, or in addition to magnetic hard disk drives, persistent storage 408 can include one or more solid state hard drives, semiconductor storage devices, read-only memories (ROM), erasable programmable read-only memories (EPROM), flash memories, or any other computer-readable storage media that is capable of storing program instructions or digital information.

The media used by persistent storage 408 can also be removable. For example, a removable hard drive can be used for persistent storage 408. Other examples include optical and magnetic disks, thumb drives, and smart cards that are inserted into a drive for transfer onto another computer-readable storage medium that is also part of persistent storage 408.

Communications unit 412 provides for communications with other computer systems or devices via a network (e.g., network 120). In this exemplary embodiment, communications unit 412 includes network adapters or interfaces such as a TCP/IP adapter cards, wireless Wi-Fi interface cards, or 3G or 4G wireless interface cards or other wired or wireless communication links. The network can comprise, for example, copper wires, optical fibers, wireless transmission, routers, firewalls, switches, gateway computers and/or edge servers. Software and data used to practice embodiments of the present invention can be downloaded through communications unit 412 (e.g., via the Internet, a local area network or other wide area network). From communications unit 412, the software and data can be loaded onto persistent storage 408.

One or more I/O interfaces 414 allow for input and output of data with other devices that may be connected to computer system 400. For example, I/O interface 414 can provide a connection to one or more external devices 420, such as a keyboard, computer mouse, touch screen, virtual keyboard, touch pad, pointing device, or other human interface devices. External devices 420 can also include portable computer-readable storage media such as, for example, thumb drives, portable optical or magnetic disks, and memory cards. I/O interface 414 also connects to display 422.

Display 422 provides a mechanism to display data to a user and can be, for example, a computer monitor. Display 422 can also be an incorporated display and may function as a touch screen, such as a built-in display of a tablet computer.

Figure 5:
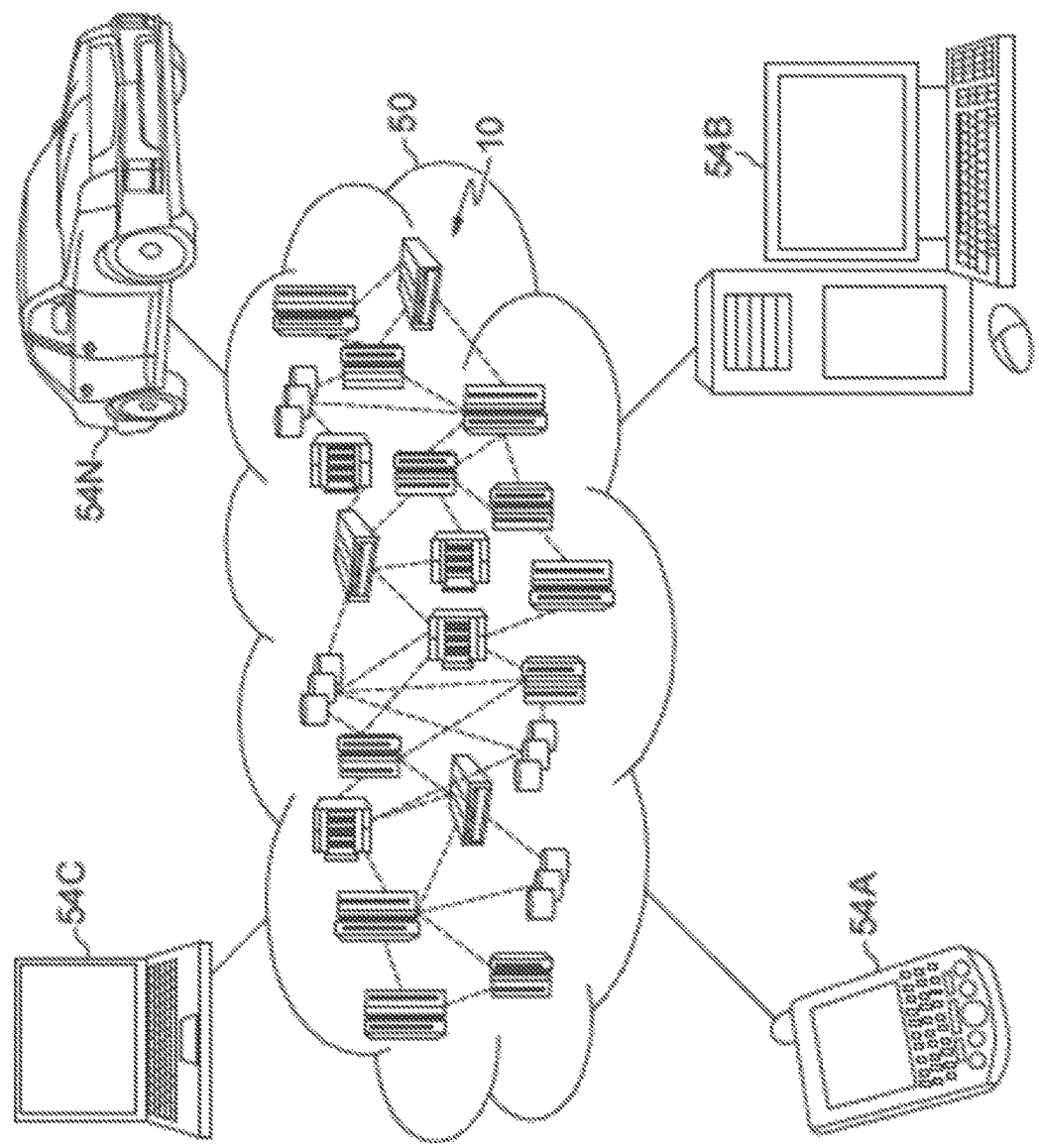
FIG. 5 depicts a cloud computing environment, in accordance with an embodiment of the present invention.

Referring now to FIG. 5, illustrative cognitive computing environment 50 is depicted. As shown, cognitive computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cognitive computing environment 50 to offer infrastructure, platforms and/or software as services for which a cloud consumer does not need to maintain resources on a local computing device. The types of computing devices 54A-N shown in FIG. 4 are intended to be illustrative only and that cloud computing nodes 10 and cognitive computing environment 50 can communicate with any type of computerized device over any type of network and/or network addressable connection (e.g., using a web browser).

Figure 6:
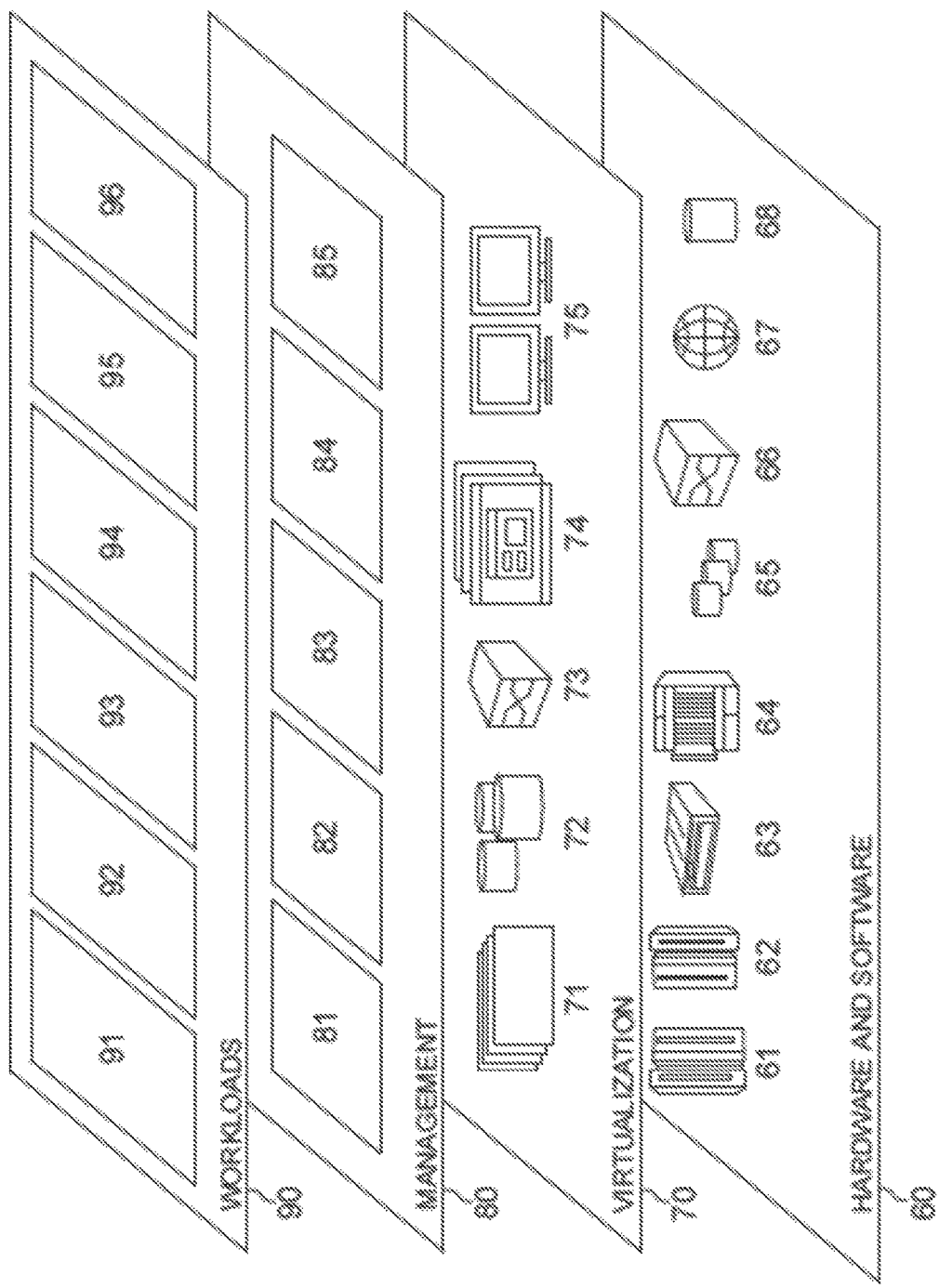
FIG. 6 depicts abstraction model layers, in accordance with an embodiment of the present invention.

Referring now to FIG. 6, a set of functional abstraction layers provided by cognitive computing environment 50 (FIG. 5) is shown. The components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cognitive computing environment. Metering and Pricing 82 provide cost tracking as resources are utilized within the cognitive computing environment, and billing or invoicing for consumption of these resources. In one example, these resources may comprise application software licenses. Security provides identity verification for cloud consumers and tasks, as well as protection for data and other resources. User portal 83 provides access to the cognitive computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cognitive computing environment may be utilized. Examples of workloads and functions which may be provided from this layer include: mapping and navigation 91; software development and lifecycle management 92; virtual classroom education delivery 93; data analytics processing 94; transaction processing 95; and cognitive computing environment 96.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cognitive computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds). A cognitive computing environment is service oriented with a focus on statelessness, low coupling, modularity, and semantic interoperability. At the heart of cloud computing is an infrastructure comprising a network of interconnected nodes.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method comprising:

producing a collection of prepared data, from structured and unstructured data, utilizing rule-based and/or machine learning techniques, wherein the structured and unstructured data is provided by a content provider;

producing a collection of vetted data, based on the collection of prepared data, utilizing a subject matter expert to create a dictionary of terms;

creating a trained algorithm based on the collection of vetted data;

utilizing the trained algorithm in combination with at least one feature from the group consisting of: language identification, semantic scoring, lemmatization, clustering and classification, key phrase extraction, synonym expansion, document and entity sentiment calculation, predictive analytics, and trending entity identification to generate, by one or more computer processors, enrichment analysis data, wherein the enrichment analysis data comprises a first set of annotations and metadata for a first plurality of documents that are part of a corpus;

determining, by the one or more computer processors, whether to generate a second set of annotations and metadata for a second plurality of documents that are part of the corpus, based on a correlation of the first set of annotations and metadata;

determining, by the one or more computer processors, whether to generate the second set of annotations and metadata, utilizing a re-trained algorithm, wherein the re-trained algorithm is created in response to updates to the collection of vetted data;

generating, by the one or more computer processors, updated enrichment analysis data, wherein the updated enrichment analysis data comprises the first set of annotations and metadata combined with the second set of annotations and metadata;

populating, by the one or more computer processors, a relational database with the enrichment analysis data, wherein the relational database is configured to manage the entire text content of the documents that are part of the corpus and participate in incremental ingestion during population of the relational database with enrichment analysis data, and wherein the relational database is configured to provide versioning capabilities for the enrichment analysis data stored in the relational database;

populating, by the one or more computer processors, the relational database with the updated enrichment analysis data;

generating, by the one or more computer processors, one or more runtime artifacts, wherein generating the one or more runtime artifacts comprises a first analysis using the enrichment analysis data against the first plurality of documents and a second analysis using the updated enrichment analysis data against the second plurality of documents; and resolving, by the one or more computer processors, a corpus-scoped query initiated by an application using the one or more runtime artifacts, wherein resolving the corpus-scoped query comprises optimizing, by the one or more computer processors, the corpus-scoped query through a query optimization feature of a relational database management system for the relational database.

* * * * *